(12) United States Patent
Chrysos et al.

(10) Patent No.: US 9,667,564 B2
(45) Date of Patent: May 30, 2017

(54) IMPLEMENTING HIERARCHICAL HIGH RADIX SWITCH WITH TIMESLICED CROSSBAR

(71) Applicant: International Business Machines Corporation, Armonk, NY (US)

(72) Inventors: Nikolaos Chrysos, Thalwil (SZ); Girish G. Kurup, Bangalore (IN); Cyriel J. Minkenberg, Gutenswil (SZ); Anil Pothireddy, Bangalore (IN); Mark L. Rudquist, Rochester, MN (US); Vibhor K. Srivastava, Sitapur Uttar Pradesh (IN); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/012,055

(22) Filed: Aug. 28, 2013

(65) Prior Publication Data

US 2015/0063348 A1 Mar. 5, 2015

(51) Int. Cl.
*H04L 12/933* (2013.01)
*H04L 12/935* (2013.01)

(52) U.S. Cl.
CPC ........ *H04L 49/101* (2013.01); *H04L 49/3063* (2013.01)

(58) Field of Classification Search
CPC ...... H04Q 11/08; H04Q 11/04; H04Q 3/1114; H04Q 3/68; H04Q 3/1611; H04L 45/00; H04L 45/28; H04L 45/745
See application file for complete search history.

(56) References Cited

U.S. PATENT DOCUMENTS 5,280,623 A * 1/1994 Sodos ............... G06F 13/28
710/105
5,572,682 A * 11/1996 Garibay, Jr. ........ G06F 9/3814
377/81
(Continued)

OTHER PUBLICATIONS

Ahn et al., "HyperX: Topology, Routing, and Packaging of Efficient Large-Scale Networks", Proceedings of the Conference on High Performance Computing Networking, Storage and Analysis Article No. 4, Nov. 2009.*
(Continued)

*Primary Examiner* — Redentor Pasia
*Assistant Examiner* — Peter Mak
(74) *Attorney, Agent, or Firm* — Joan Pennington (57) ABSTRACT

A method and system are provided for implementing a hierarchical high radix switch with a time-sliced crossbar. The hierarchical high radix switch includes a plurality of inputs and a plurality of outputs. Each input belongs to one input group; each input group sends consolidated requests to each output, by ORing the requests from the local input ports in that input group. Each output port belongs to one output group; each output port grants one of the requesting input groups using a rotating priority defined by a next-to-serve pointer. Each output group consolidates the output port grants and allows one grant to pass back to an input group. Each input port in an input group evaluates all incoming grants in an oldest packet first manner to form an accept. Each input group consolidates the input port accepts and selects one accept to send to the output port.

18 Claims, 7 Drawing Sheets

(56) References Cited

U.S. PATENT DOCUMENTS

| | | | |
|---|---|---|---|
| 6,052,368 A | 4/2000 | Aybay | |
| 6,208,667 B1* | 3/2001 | Caldara | H04J 3/0608 370/503 |
| 6,888,841 B1 | 5/2005 | Ozaki | |
| 7,609,695 B2 | 10/2009 | Zhu et al. | |
| 2001/0050916 A1* | 12/2001 | Krishna | H04L 12/5601 370/419 |
| 2001/0053157 A1 | 12/2001 | Li | |

OTHER PUBLICATIONS

Kim et al., "Microarchitecture of a High-Radix Router", ACM SIGARCH Computer Architecture News—ISCA 2005 Homepage vol. 33 Issue 2, May 2005, pp. 420-431.*
Jun et al., "A Two-Dimensional Scalable Crossbar Matrix Switch Architecture", Communications, 2003. ICC '03. IEEE International Conference on vol. 3, May 11-15, 2003.*
Kim, J. et al.; "Microarchitecture of a High-Radix Router"; Proceedings of the 32nd International Symposium on Computer Architecture (ISCA'05); IEEE; 2005.
Kar, K. et al.; "Reduced Complexity Input Buffered Switches"; http://citeseerxist.psu.edu.viewdoc/summary?doi=10.1.1.37. 7524 . . . ; Hot Interconnect 2000; Jul. 16, 2011.
Chrysos, N. et al.; "Scheduling in switches with small internal buffers"; GLOBECOM '05; IEEE Global Telecommunications Conference (IEEE Cat. No. 05CH37720); 6 pp.; IEEE.; 2006.
Input Buffered Switching Device Including Bypass Logic U.S. Appl. No. 13/762,583, filed Feb. 8, 2013.
"Weightage-Based Scheduling for Hierarachical Switching Fabrics" U.S. Appl. No. 13/664,794, filed Oct. 31, 2012.

* cited by examiner

IMPLEMENTING HIERARCHICAL HIGH RADIX SWITCH WITH TIMESLICED CROSSBAR

FIELD OF THE INVENTION

The present invention relates generally to the data processing field, and more particularly, relates to a method, and system for implementing a hierarchical high radix switch with a time-sliced crossbar.

DESCRIPTION OF THE RELATED ART

Crossbars are the basic building blocks for on-chip interconnects, and large, off-chip switching fabrics, such as those that are found in data centers. High-radix crossbars or crossbars with many ports, are always desired, as they enable creating large networks with fewer silicon chips, thus with less cost.

Despite technology scaling, crossbar port scaling is complicated by the quadratic cost of crossbars, as well as by the targeted port speed which also increases from one silicon generation to the next. A problem results from the required routing of a large number of wires in a small area of silicon. Even in cases where the required routing seems feasible on paper, placement-and-routing tools commonly find it difficult to achieve efficient routing of many wires. In addition, a large number of input and output ports can drive up chip area, necessitating pipelining data transfers across the chip.

The same complexity holds for crossbar schedulers, which must also scale together with the crossbar data-path. Most crossbar schedulers are based on a distributed request-grant arbitration, between input and output arbiters. Flat schedulers, having one arbiter for each input and output port, achieve the best delay-throughput and fairness performance. However routing the wires between N input and N output arbiters requires a full-mesh interconnect, with quadratic cost, which may become expensive for crossbars with more than 64 ports. To overcome this cost, hierarchical scheduling solutions are in many cases employed. Inputs are organized in groups, for example quads, and arbitration is performed at the quad level.

Quad-based scheduling reduces the number of wires required to be routed within the chip area dedicated to the crossbar scheduler but still the problem remains of how to maintain the total crossbar bandwidth, and basic fairness properties, when the number of crossbar ports is reduced.

SUMMARY OF THE INVENTION

Principal aspects of the present invention are to provide a method, and system for implementing a hierarchical high radix switch with a time-sliced crossbar. Other important aspects of the present invention are to provide such method, and system substantially without negative effects and that overcome many of the disadvantages of prior art arrangements.

In brief, a method, and system are provided for implementing a hierarchical high radix switch with a time-sliced crossbar. The hierarchical high radix switch includes a plurality of inputs and a plurality of outputs. An input port requests an output when it has a packet for that output port in its data queues. Each input belongs to one input group; each input group sends consolidated requests to each output, by ORing the requests from the local input ports in that input group. Each output port belongs to one output group; each output port grants one of the requesting input groups using a rotating priority defined by a next-to-serve pointer. Each output group consolidates the output port grants and allows one grant to pass back to an input group. Each input port in an input group evaluates all incoming grants in an oldest packet first manner to form an accept. Each input group consolidates the input port accepts and selects one accept to send to the output port.

In accordance with features of the invention, incoming data at an input port is buffered to create wide words to transmit through the crossbar.

In accordance with features of the invention, an internal crossbar connecting all input groups to all output groups with a data width is k times the width of the incoming data stream, where k=the number of ports in an input/output group.

In accordance with features of the invention, at the output of the crossbar, data is serialized from the wide word to the link width.

In accordance with features of the invention, scheduling proceeds in a pipelined manner of request/grant/accept, each occurring on consecutive clock cycles.

In accordance with features of the invention, one data transfer per packet per supercycle is provided, where a supercycle includes a number of timeslices k of internal clock cycles, where k=the number of ports in an input/output group.

In accordance with features of the invention, there is a separate arbitration path from a data path.

In accordance with features of the invention, packet cut through is supported.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, and system are provided for implementing a hierarchical high radix switch with a time-sliced crossbar.

In accordance with features of the invention, the hierarchical high radix switch with the time-sliced crossbar using the hierarchical timesliced approach has allowed implementation of a 136×136 port switch. In this implementation, 4 ports are grouped together to form a group, and each group is named a quad. This results in 34 quads. A switch port within a quad is referred to herein as a subport.

In accordance with features of the invention, inside the switch, the internal clock cycles are conceptually organized in groups of four, yielding four timeslices, which are denoted by timeslice 0, 1, 2, 3, or colors black, green, red, and blue. For example, to enumerate clock cycles, then the present clock cycle (cc) mod 4 gives the index (or color) of the current timeslice. Each cycle of all timeslice colors are referred to as a supercycle. A supercycle begins with the start of each clock cycle cc0 (cc0 mod 4=0), and ends with clock cycle cc3 (cc3 mod 4=3).

In accordance with features of the invention, the transfer of a packet from an input to an output occurs in steps, during consecutive timeslices of the same color. In order to transport a packet p, a timeslice is allocated, for example green, at which the corresponding crossbar input and output ports are idle. These crossbar ports are booked for all green timeslices while the packet is being transferred; the remaining timeslices are however free, and may be assigned to transfer other packets from the same crossbar input, or to the same crossbar output in parallel with the transfer of packet p. The crossbar ports of packet p are able to allocate their green timeslice to any other packet after they have finished with packet p.

Figure 1:
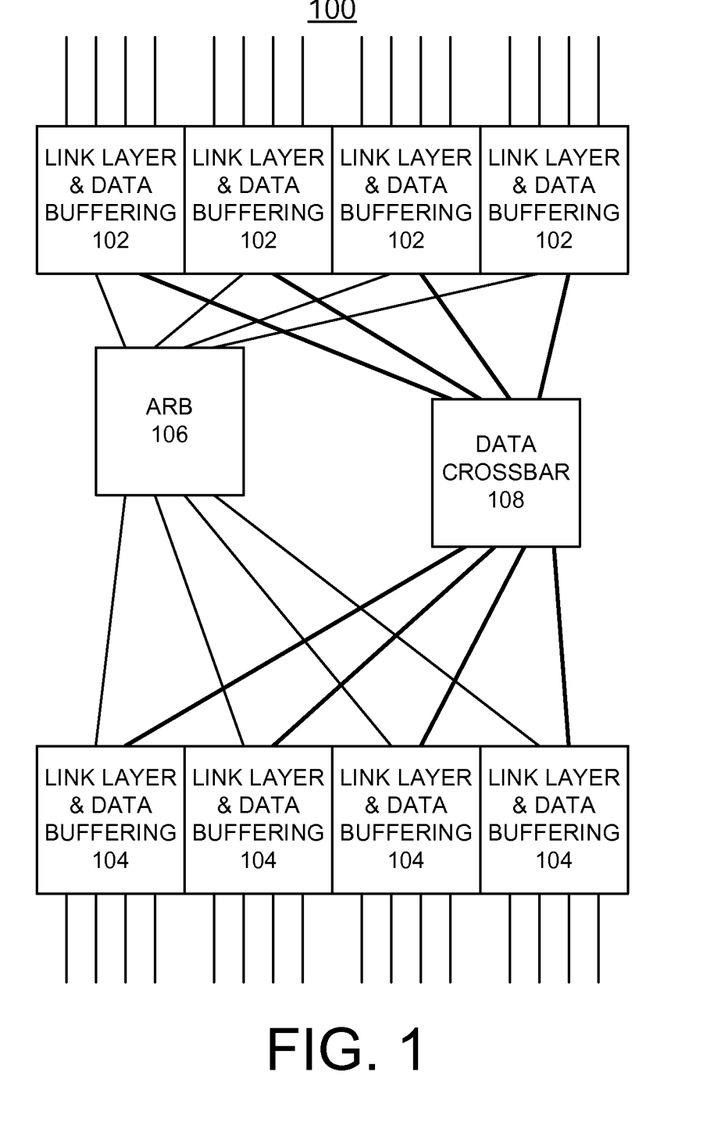
FIG. 1 illustrates an example high level switch structure, with reduced links depicted, in accordance with a preferred embodiment.

Having reference now to the drawings, in FIG. 1, there is shown an example switch generally designated by the reference character 100 for implementing hierarchical high radix switching with a time-sliced crossbar in accordance with the preferred embodiment.

Switch system 100 comprises of 3 key elements including a plurality of respective input and output link layer and data buffering logic blocks 102, 104, an arbitration element ARB 106, and a wide, in relation to the incoming data rate, low port crossbar 108.

The link layer of logic blocks 102, 104 manages the link protocol, including credits, error checking, and packet transmission. The data buffering block of logic blocks 102, 104 receives incoming packet flits, such as two flits per cycle, and buffers these flits in an 8 flit wide array. This buffering block of logic blocks 102, 104 also handles sequencing an arbitration winning packet out to the data crossbar, as well as receiving incoming crossbar data to sequence to an output link.

The arbitration element ARB 106 includes, for example, 34 input arbiters, and 34 output arbiters. The input arbiter of ARB 106 queues incoming packet destination information and manages active transfers from that input quad. The output arbiter of ARB 106 tracks outgoing subport availability and provides fairness through the use of a per subport next_to_serve pointer. When a packet wins arbitration, the input arbiter of ARB 106 signals to input data buffer 102 to start a packet transfer, the data crossbar 108 to route the data to the correct output data buffer 104, and the output data buffer 014 to expect an incoming packet.

The wide low port crossbar 108 in example switch 100 of the preferred embodiment utilizes, for example, a 34×34@40 B crossbar reducing the number of wires by ~16× compared to a flat 136×136@ 10 B crossbar. A key attribute is that the crossbar 108 provides an internal speed up, relative to the link data rate. In this example implementation, the internal speedup was 1.45.

In accordance with features of the invention, the switch arbitration proceeds with a request/grant/accept protocol and the formation details are described in the following.

Figure 2:
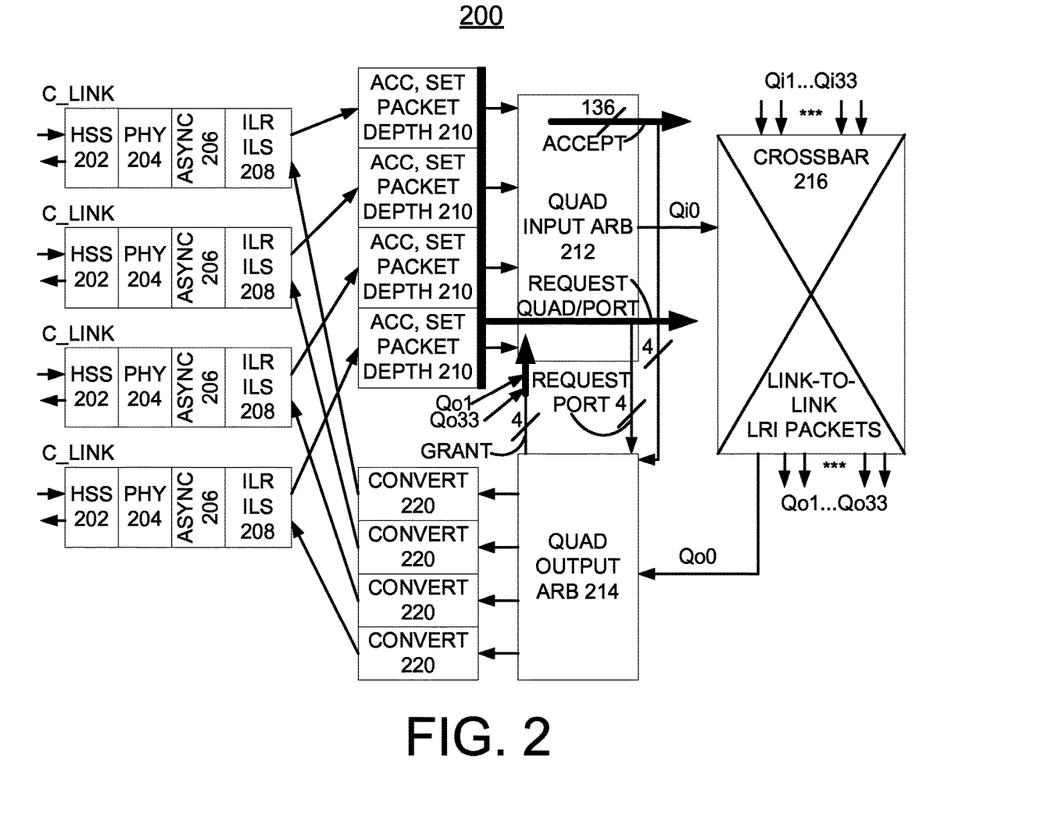
FIG. 2 illustrates an example of data packet flow and arbitration of the switch structure of FIG. 1 in accordance with a preferred embodiment.

Referring now to FIG. 2, there is shown an example of a data packet flow and arbitration generally designated by the reference character 200 of the switch 100 in accordance with a preferred embodiment. A High Speed Serial (HSS) link 202 receives and passes packet data indicated at lines C_LINK at a rate, such as of 10 B/cycle, via an interface physical layer protocol, or PHY 204 and an asynchronous block ASYNC 206 to an integrated link protocol block 208 including an integrated link receive (ILR) and an integrated link send (ILS) 208. Packet data is checked by link protocol with the integrated link receive (ILR) 208, accumulated and buffered in an accumulator (ACC) data buffer 210 in the width of 40 B/cycle read bandwidth. A quad input arbiter ARB 212 and a quad output arbiter ARB 214 is coupled between the accumulator (ACC) data buffer 210 and a crossbar 216, for example, a 34×34@40 B, 450 MHz crossbar. Crossbar 216 passes packet data through the crossbar at the rate of 40 B once per supercycle, and then converted back to 10 B over a 4 cycles (supercycle) by a convert block 220 and passed to the output link or integrated link send (ILS) 208.

Each incoming packet is assigned a buffer location at the start of the packet. This buffer location and the output destination link are communicated to the ARB block 212 at the start of the packet. The data buffering block 210 also communicates when the packet has been fully received (the tail) to the ARB block 212. In this manner, the ARB block 212 can decide to allow the packet to participate in arbitration as soon as any valid header flits have arrived (cut-through) or only after it is fully buffered (store and forward).

When a packet wins arbitration in the ARB block 212, it will signal the input data buffer 210 to start transferring that packet with a start signal and buffer to transfer location. In response to a start signal and buffer location from the arbitration block 212, the data buffer 210 reads the buffered flits from the array, and passes the buffered flits to the crossbar 216. In operation, the clock cycle that the start signal arrives on determines which cycle of the super cycle (or color) will be utilized for this packet's data transfer. This cycle index or color will be occupied at both the input and output data buffer, until the input data buffer signals the final packet flits are transmitted. It should be understood that the same cycle index or color can be simultaneously utilized by outer input/output pairs.

In the case that the incoming packet Qi1-Qi33 has been fully received before it won arbitration, each transfer through the crossbar 216 (1 per supercycle) will contain 40 B of data, until the final transfer. In the case the packet is still arriving when it wins arbitration, the transfer through the crossbar 216 will occur at the 40 B rate for any buffered data, and when that is exhausted, the remaining data will transfer at the incoming line rate. At the output data buffer, it is necessary to serialize the 40 B data into maximum 10 B over the 4 cycle supercycle. This guarantees all data will be passed to the sending link before the next crossbar transfer arrives.

Figure 3:
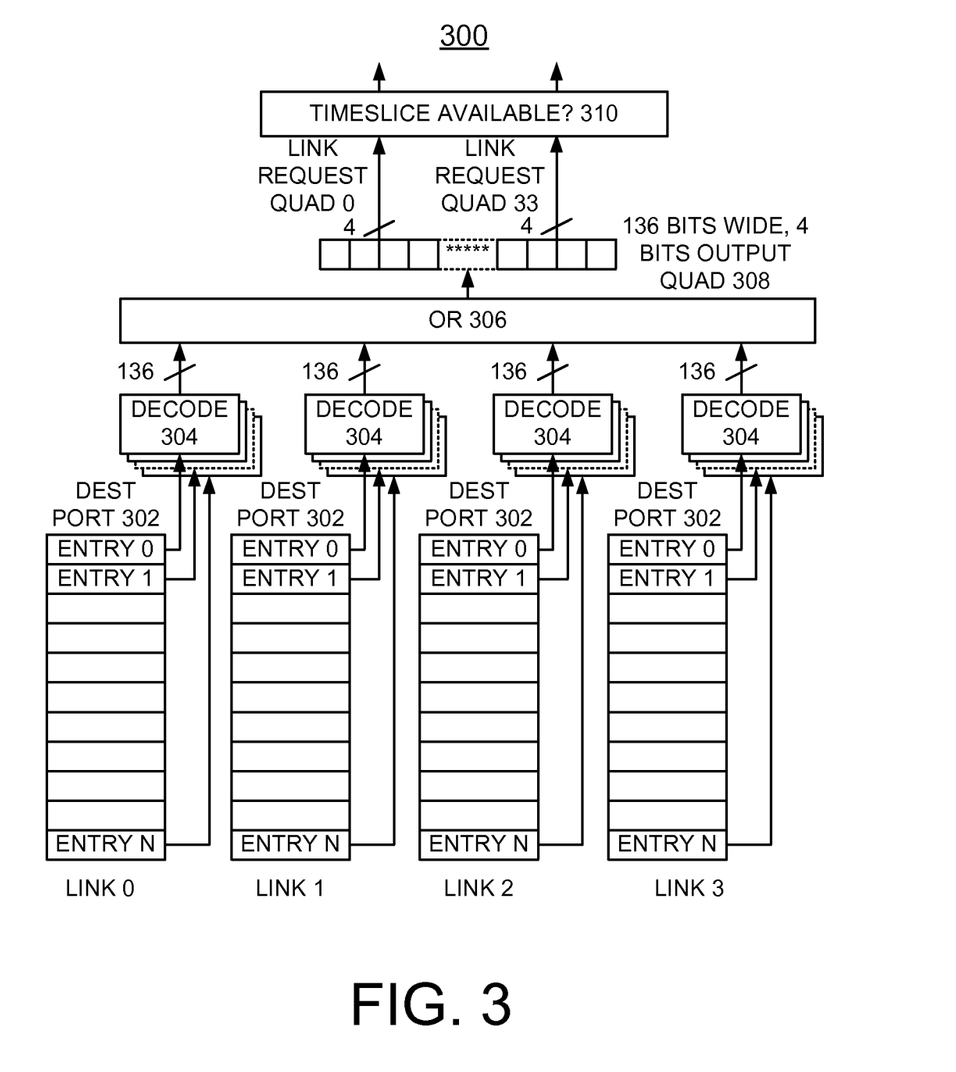
FIG. 3 illustrates an example of request formation of the switch structure of FIG. 1 in accordance with a preferred embodiment.

Each input arbiter 212 manages the requests from 4 links through the use of a link queue (linkq) as illustrated and described with respect to FIG. 3.

Referring also to FIG. 3, there is shown an example of a request formation generally designated by the reference character 300 of the switch 100 in accordance with a preferred embodiment. A destination port 302 of respective links 0-3 includes a plurality of entries 0-N, where N=33 for an example 136×136 port switch, each coupled to a decode 304 of the destination port 302 with a decode performed for every valid entry. This results in 4×(N+1) or 4×(33+1) vectors for the example 136×136 port switch, of width equal to the number of possible destination ports 302. For this implementation, each linkq contains 16 entries, and has a choice of 136 possible destination ports. Each linkq entry is decoded, and all linkq decoded entries are OR'd together, then all linkq results are ORed together. These requests are ORed together by an OR 306 and latched to meet timing. This ORed request forms a 136 bit Request vector, with each bit corresponding to a particular output link.

The request vector is broken into 34 output quad, 4-bit groups 308, and each bit in the 4-bit group corresponds to a specific output subport in that output quad LINK REQUEST QUAD 0-LINK REQUEST QUAD 33. The request vector consolidates requests from the input subports. Each input arbiter 212 also tracks the timeslices, or colors, when that input's data buffer is transferring data to the crossbar 216. When a timeslice is already busy identified at timeslice available block 310, the request vector will be suppressed to avoid an output arbiter issuing a wasted grant, which is a grant that could never be accepted because the timeslice was busy.

In operation, at the output arbiter 214, the incoming 4 bit requests from each input arbiter 212 are converted into a 34 bit request vector per link. Then each link determines if it can grant an incoming request with the following rules:
  an output subport cannot issue a grant if it has no credits;
  an output subport cannot issue a grant if it is busy in any clock cycle in a supercycle;
  an output subport cannot issue a grant if the output quad is busy in the corresponding transfer clock cycle; and
  an output subport cannot issue a grant to a different input arbiter if it issued a grant the previous cycle.

Starting from the next_to_serve pointer, each link looks at the its incoming 34 bit request vector and chooses the next request to serve. If any of the criteria above are met, the grant will be suppressed for that link.

If multiple links are able to issue a grant, a resolution algorithm is required to determine which per link grant will become the final grant. These resolution algorithms can include, for example a round robin algorithm, or another algorithm.

When a per-link-grant is the winner of the multiple grant resolution, it needs to update the next_to_serve pointer. This implementation allows a configurable policy of advancing the next_to_serve pointer when issuing a grant, or only advancing the next_to_serve pointer when the grant is accepted. Four bits (4 bits) of the 136 bit Final Quad Grant vector are sent to each input arbiter 212 for accept processing as illustrated and described with respect to FIG. 4.

Figure 4:
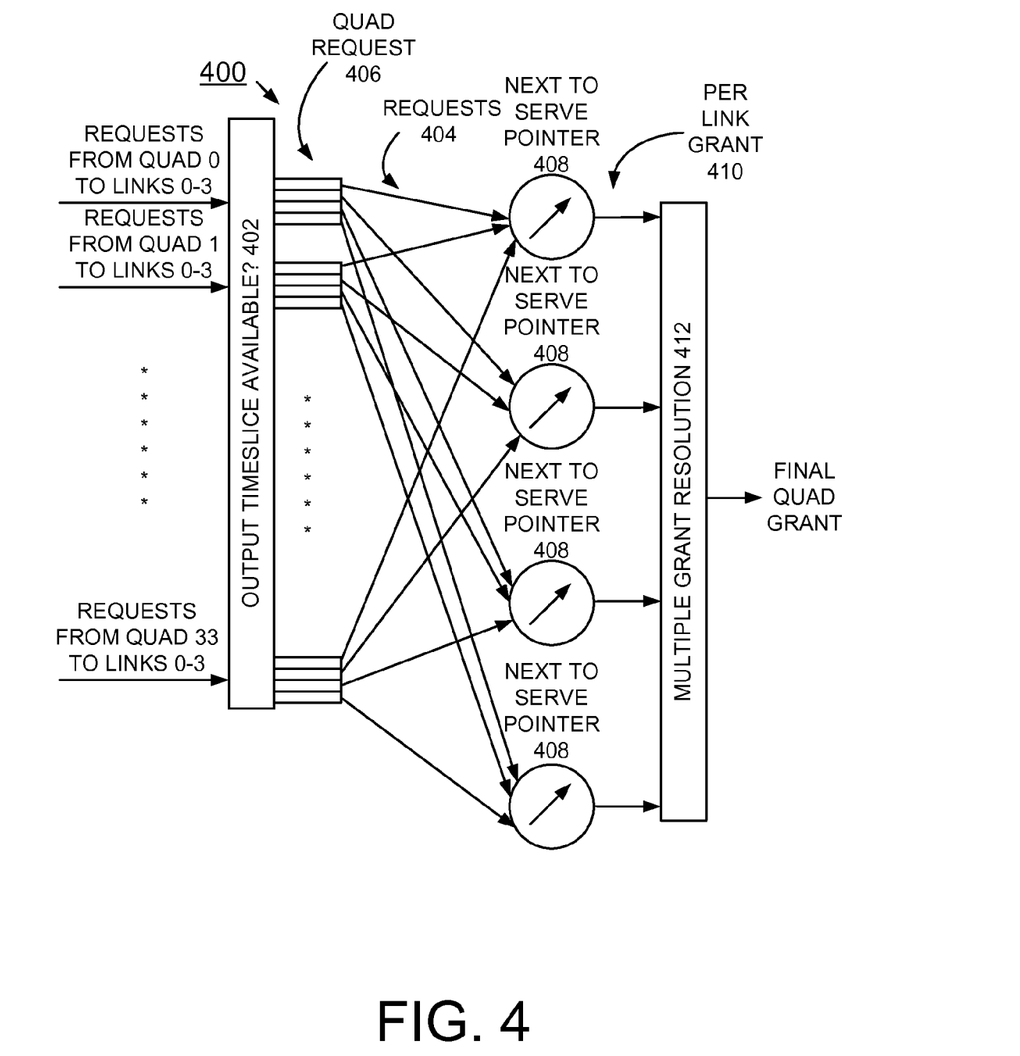
FIG. 4 illustrates an example of grant processing of the switch structure of FIG. 1 in accordance with a preferred embodiment.

Referring also to FIG. 4, there is shown an example of grant processing generally designated by the reference character 400 of the switch 100 in accordance with a preferred embodiment. As shown, requests from quad 0 to links 0-3 through quad 33 to links 0-3 are applied to an output timeslice available block 402, and respective requests 404 from quad requests 406 are applied to a next-to-serve-pointer 408. A per link grant 410 from the next-to-serve-pointer 408 is applied to a multiple grant resolution 412 providing an output of final quad grant.

Each clock cycle the input arbiter receives this 4-bit grant vector from each output quad, informing which output quads, and for which specific output subport, have issued a grant to this input quad. It is possible to receive 1 grant per output quad.

The grant vector is reordered to match the original request vectors formed.

Figure 5:
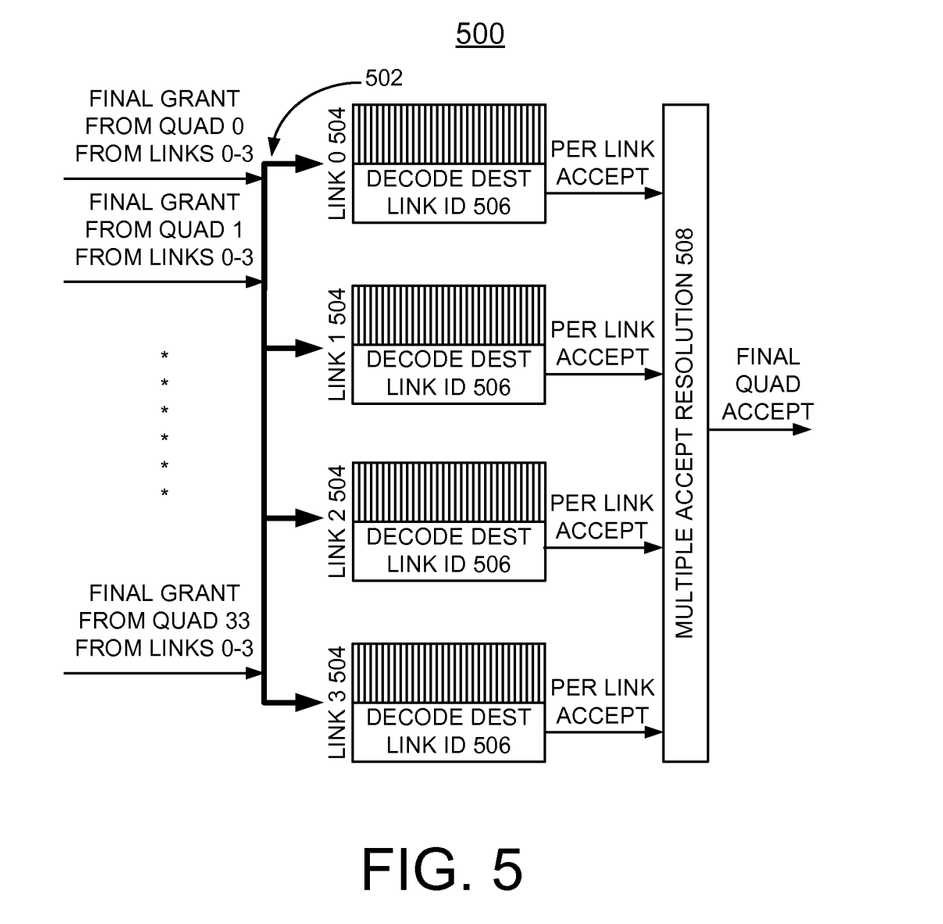
FIG. 5 illustrates an example of accept processing of the switch structure of FIG. 1 in accordance with a preferred embodiment.

Referring also to FIG. 5, there is shown an example of accept processing generally designated by the reference character 500 of the switch 100 in accordance with a preferred embodiment. As shown, final grants from quad 0 to links 0-3 through quad 33 to links 0-3 as indicated at line 502 are applied to respective links 0-3, 504 including a decode destination link ID 506. A per link accept from respective links 0-3, 504 is applied to a multiple accept resolution 508 providing an output of final quad accept.

As illustrated in FIG. 5, starting from the oldest entry in each linkq, a search is performed to find the oldest entry that matches the incoming grant vector. If multiple linkqs are capable of accepting a grant, multiple accept resolution must occur, which is similar to the grant resolution. The resolution algorithms can include, for example a round robin algorithm, or another algorithm.

When a packet has been accepted, the input arbiter 212 will signal to the matching data buffer block 210 to start a transfer on that cycle (or color) within the supercycle. This timeslice will be marked as busy in both the input and output arbiter, and prevent any other arbiter from driving data from the input or to the output in that cycle. This input/output timeslice pair will remain busy until the input data buffer block signals the transfer is complete. The input arbiter does not store any length information, as it may not be known if the packet is being transferred in a cut through manner.

Figure 6:
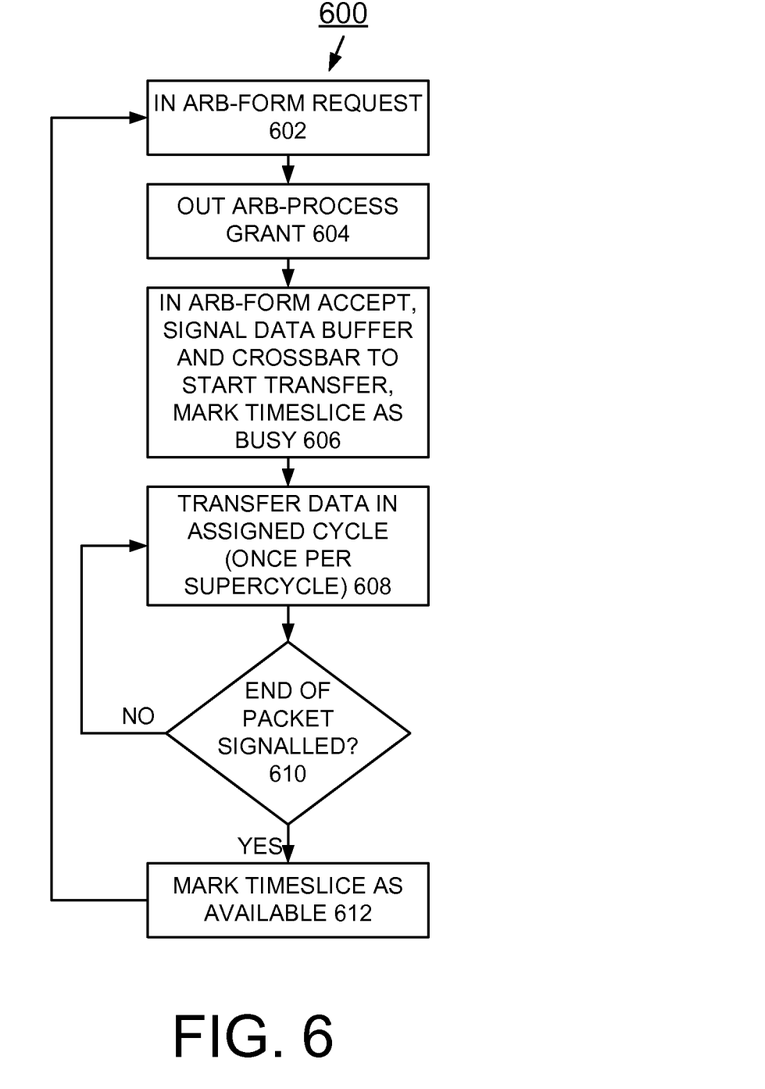
FIG. 6 is a flow chart illustrating example dataflow and timeslice operations including arbitration process, marking a timeslice busy, and clearing the busy status operations of the switch structure of FIG. 1 in accordance with a preferred embodiment.

Referring now to FIG. 6, there are shown example arbitration process, marking a timeslice busy, and clearing the busy status operations generally designated by the reference character 600 of the switch 100 in accordance with a preferred embodiment. The arbitration process includes the input arbiter forming request as indicated at a block 602, and the output processing grant as indicated at a block 604. The input arbiter forms accept, signals the data buffer and crossbar to start transfer, and marks timeslice as busy as indicated at a block 606. Data are transferred in the assigned cycle, once per supercycle, as indicated at a block 608. Checking for end of packet being signaled is performed as indicated at a decision block 610. When the end of packet is not being signaled, then data are transferred in the assigned cycle, once per supercycle, at block 608. When the end of packet is being signaled, then the timeslice is marked as available as indicated at a block 612. Then the operations continue returning to block 602.

Figure 7:
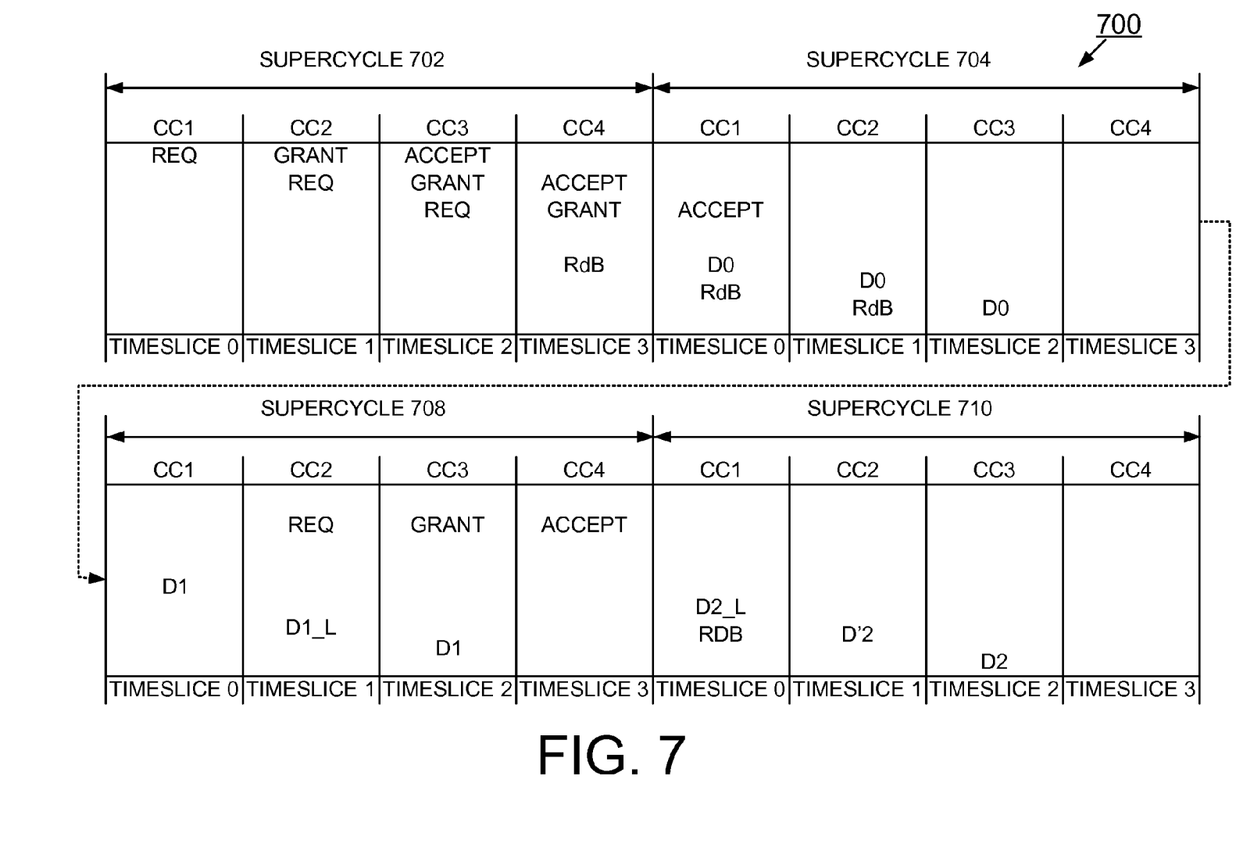
FIG. 7 is a chart illustrating example dataflow and timeslice operations of the switch structure of FIG. 1 in accordance with a preferred embodiment.

Referring now to FIG. 7, there is shown a chart illustrating example dataflow and timeslice operations generally designated by the reference character 700 of the switch 100 during multiple supercycles in accordance with a preferred embodiment.

As depicted in FIG. 7, when a packet wins arbitration, it will occupy that timeslice within a supercycle for the duration of the packet, as shown in example supercycles 702, 704, 706, 708, each including timeslices 0-3. Note that it is the accept cycle that determines the timeslice that will be occupied.

It should be understood that this does not mean that if the accept is on timeslice i (e.g. red) the transfer will be on red (I) timeslices. In the model and in the hardware, the transfer will be on timeslices (i+2) mod 4, i.e. two clock cycles after the accept was evaluated. There is an one-to-one relationship: if the accept is on timeslice i, the transfer will definitely take place timeslices on (i+2) mod 4. It should noted also that for a transfer on timeslice (i+2) mod 4 there must have been a request issued on timeslice (i−2) mod 4=(i+2) mod 4, and a grant issued on timeslice (i−1) mod 4=(i+4-1) mod 4. This should be understood that there is no storing of requests or of grants at output or input groups, respectively. There can be an arbitrary time between a Request first being issued and it finally making it through the grant and accept process. The pipelined operation implies that for each Accept issued on clock cycle i, there must have been a corresponding Grant issued on cycle i−1, and a corresponding Request issued on clock cycle i−2. FIG. 7 shows the best case request/grant/accept processing. The goal of the scheduler is to produce conflict-free (bipartite matches) for each timeslice. It is possible a quad could have 4 parallel transfers, occupying all timeslices of a supercycle.

While the present invention has been described with reference to the details of the embodiments of the invention shown in the drawing, these details are not intended to limit the scope of the invention as claimed in the appended claims.

What is claimed is:

1. A method for implementing hierarchical high radix switching with a time-sliced crossbar comprising:

providing a switching device comprising a plurality of inputs and a plurality of outputs; each input port belongs to one input group; and each output port belongs to one output group; providing a first respective link layer and data buffering logic block coupled to one said input group of said plurality of inputs; and providing a second respective link layer and data buffering logic block coupled to one said output group of said plurality of outputs; providing an arbitration element coupled to each said first respective link layer and data buffering logic block and coupled to each said second respective link layer and data buffering logic block; and providing a data crossbar coupled to each said first respective link layer and data buffering logic block and coupled to each said second respective link layer and data buffering logic block;

one said input port receiving a packet in its data queues for one said output port; and said input port requesting an output for one said output port;

each said input group, sending consolidated requests to each output by ORing the requests from the local input ports in said respective input group;

each said output port, granting one of the requesting input groups using a rotating priority defined by a next-to-serve pointer;

each said output group consolidating the output port grants and allowing one grant to pass back to one said input group;

each said input port in said input group evaluating all incoming grants in an oldest packet first manner to form an accept; and each said input group consolidating the input port accepts and selecting one accept to send to the output port;

providing said arbitration element with multiple input arbiters and multiple output arbiters; providing a separate arbitration path from a data path, each said input arbiter forming a request, queuing incoming packet destination information and managing active transfers; and each said output arbiter processing a grant, tracking subport availability and providing fairness using the next-to-serve pointer;

each said first respective link layer and data buffering logic block and each said second respective link layer and data buffering logic block managing link protocol, and handling sequencing an arbitration winning packet out to the data crossbar, and receiving incoming crossbar data to sequence to an output link; and starting a data transfer, marking a time slice as busy, signaling data buffer logic and said data crossbar to start the packet data transfer, and transferring data in an assigned cycle once per supercycle and continuing data transfers until receiving an end of packet being signaled to guarantee all packet data is transferred; and marking the time slice as available.

2. The method as recited in claim 1 includes buffering incoming data at each said input port to create wide words to transmit through the time-sliced crossbar.

3. The method as recited in claim 1 includes providing an internal crossbar data width equal to k times the width of the incoming data stream, where k=the number of ports in an input/output group.

4. The method as recited in claim 1 includes at the output of the crossbar, serializing data from a wide word to a link width.

5. The method as recited in claim 1 wherein scheduling proceeds in a pipelined manner of request, grant, and accept, each occurring on consecutive clock cycles.

6. The method as recited in claim 1 includes providing one data transfer per packet per supercycle.

7. The method as recited in claim 1 includes providing packet store and forward or selectively providing packet cut through responsive to receiving valid header information.

8. The method as recited in claim 7 further includes enabling packet arbitration to start packet transfer.

9. A system for implementing a hierarchical high radix switch comprising:

a switching device comprising a wide timesliced access crossbar connected to a plurality of inputs and a plurality of outputs; each input port belongs to one input group; and each output port belongs to one output group;

a first respective link layer and data buffering logic block coupled to one said input group of said plurality of inputs; and a second respective link layer and data buffering logic block coupled to one said output group of said plurality of outputs;

an arbitration element coupled to each said first respective link layer and data buffering logic block and coupled to each said second respective link layer and data buffering logic block;

said data crossbar coupled to each said first respective link layer and data buffering logic block and coupled to each said second respective link layer and data buffering logic block;

said arbitration element including multiple input arbiters and multiple output arbiters and having a separate arbitration path from a data path; each said input arbiter forming a request, queuing incoming packet destination information and managing active transfers; and each said output arbiter processing a grant, tracking subport availability and providing fairness using the next-to-serve pointer;

each said first respective link layer and data buffering logic block and each said second respective link layer and data buffering logic block managing link protocol, and handling sequencing an arbitration winning packet out to the data crossbar, and receiving incoming crossbar data to sequence to an output link comprising;

one said input port receiving a packet in its data queues for one said output port; and said input port requesting an output for one said output port; each said input group, sending consolidated requests to each output by ORing the requests from the local input ports in said respective input group; each said output port, granting one of the requesting input groups using a rotating priority defined by a next-to-serve pointer; each said output group consolidating the output port grants and allowing one grant to pass back to one said input group; and each said input port in said input group evaluating all incoming grants in an oldest packet first manner to form an accept; and each said input group consolidating the input port accepts and selecting one accept to send to the output port; and said arbitration element starting a packet data transfer, signaling data buffer logic and said data crossbar to start the packet data transfer, marking a time slice as busy, and transferring data per packet in an assigned cycle once per supercycle and continuing data transfers until an end of packet being signaled to guarantee all packet data is transferred; and marking the time slice as available.

10. The system as recited in claim 9 wherein said link layer and data buffering logic block buffers incoming data at an input port to create wide words to transmit through the wide timesliced access crossbar.

11. The system as recited in claim 9 wherein an internal crossbar data width equals k times the width of the incoming data stream, where k=the number of ports in an input/output group.

12. The system as recited in claim 9 wherein said link layer and data buffering logic block at the output of the crossbar serializes data from the wide word to the link width.

13. The system as recited in claim 9 wherein scheduling proceeds in a pipelined manner of request, grant, and accept, each occurring on consecutive clock cycles.

14. The system as recited in claim 13 wherein said arbiter provides one data transfer per packet per supercycle.

15. The system as recited in claim 9 wherein data transfer includes packet store and forward or selectively providing packet cut through responsive to receiving valid header information.

16. The system as recited in claim 9 wherein said wide timesliced access crossbar provides an internal speed up, relative to the link data rate.

17. The system as recited in claim 9 wherein said link layer and data buffering logic block buffers incoming packet flits, handles sequencing an arbitration winning packet out to said wide timesliced access crossbar, and handles receiving incoming crossbar data to sequence to an output link.

18. The system as recited in claim 9 wherein said arbiter comprises a plurality of respective input arbiters and a plurality of respective output arbiters.

* * * * *